(No Model.)
W. SOBEY.
CLAMP FOR HARROW TEETH.
No. 538,848. Patented May 7, 1895.
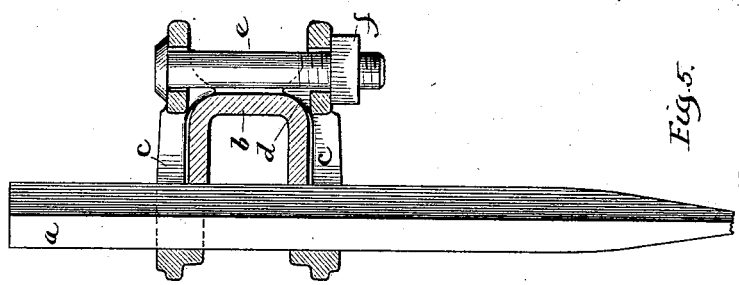
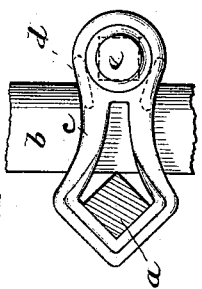
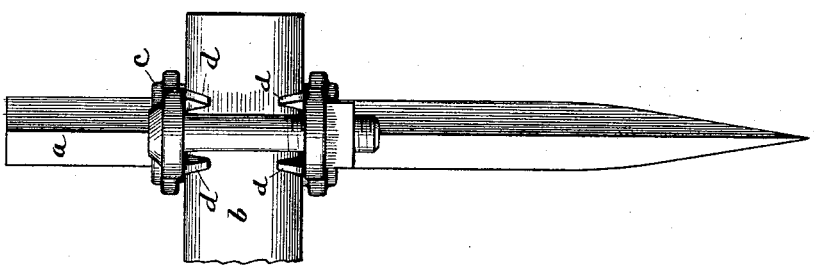
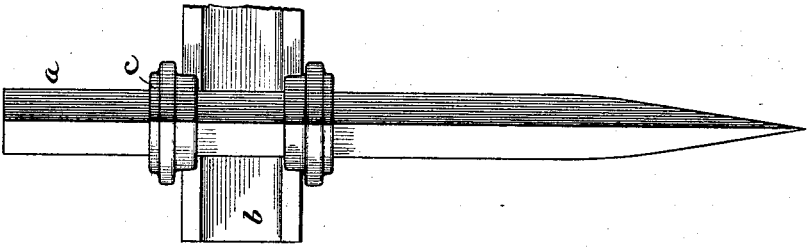
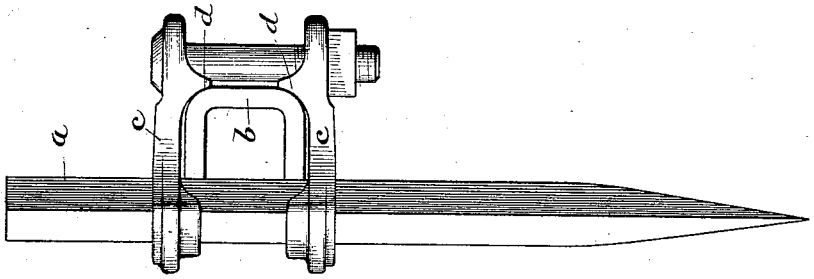
Witnesses.
Fred Gerlach
Arthur R. Chetts
Inventor:
William Sobey
By Deiner Fisher
Attorneys.

UNITED STATES PATENT OFFICE.

WILLIAM SOBEY, OF RACINE, WISCONSIN, ASSIGNOR TO THE J. I. CASE PLOW WORKS, OF SAME PLACE.

CLAMP FOR HARROW-TEETH.

SPECIFICATION forming part of Letters Patent No. 538,848, dated May 7, 1895.

Application filed October 22, 1894. Serial No. 526,593. (No model.)

*To all whom it may concern:*

Be it known that I, WILLIAM SOBEY, a resident of the city and county of Racine, State of Wisconsin, have invented certain new and useful Improvements in Clamps for Harrow-Teeth, of which the following is hereby declared to be a full, clear, and exact description, sufficient to enable others skilled in the art to make and use the same.

The invention relates to the clamps or unions for securing the teeth to the bars of a harrow frame, and the purpose is to provide an improved clamp to hold the teeth in place, and which may yet allow each tooth to be adjusted vertically at will on its bar so as to run deep or shallow.

The nature of the invention will appear in detail from the description following and be thereafter more distinctly defined by claims at the conclusion thereof.

In the drawings annexed like parts are denoted by like letters throughout.

Figure 1 is a view in end elevation showing the tooth united to the harrow-bar by the improved clamp. Figs. 2 and 3 are views thereof in rear and front elevation. Fig. 4 is a view of the parts in longitudinal section through the clamp. Fig. 5 is a plan view of the structure.

The harrow tooth $a$ is of usual form and when mounted in place may be caused to abut at its edge directly against the face of the harrow bar $b$ which as here shown consists of the familiar U-channel iron designed to sustain a series of the teeth against the U-wings at suitable distances apart along the channel bar. Extending across the harrow bar above and below are the dual clips $c$ having eyes at the front through which the tooth $a$ passes and by which it is firmly clasped in position. Near their opposite ends the clips are furnished with cams $d$ which bear against reverse slopes on the adjacent base of the U-channel or other harrow bar. Through holes in the tails of the clips extends the cross-bolt $e$ which may be threaded as appears and furnished with a nut $f$ to adjustably clamp the parts together. The tooth being set in desired position through the eyes of the clips it is clear that by turning the nut $f$ the cams $d$ ride against the counter-part bearings on the harrow bar and gradually draw the tooth stoutly home to a secure seat in conjunction with the bar. Since the cams $d$ overlie the bar it is manifest that the tooth is firmly held against play in any direction. By releasing the nut $f$ the clips relax their grasp upon the tooth and permit the same to be raised or lowered vertically as may be necessary.

Having thus described the invention, what I claim as new, and desire to secure by Letters Patent, is—

1. The combination with the harrow-bar and with the separate upright tooth, of the dual clips having eyes to inclose said tooth and at the opposite ends furnished with cam-bearings to engage said bar, and the adjustable cross-bolt united to the tails of said clips, substantially as described.

2. The combination with the U-bar and with the upright tooth abutting thereon, of the dual clips engaging said tooth and having cam-bearings to rest upon the reverse slopes at the base of the U-bar, and a threaded cross-bolt to unite the tail of the clips, substantially as described.

WILLIAM SOBEY.

Witnesses:
HENRY M. WALLIS,
CHRISTOPHER C. GITTINGS.